United States Patent
Dadas et al.

(10) Patent No.: US 12,408,027 B2
(45) Date of Patent: Sep. 2, 2025

(54) METHOD FOR ACTIVATING AN OPERATIONAL PROFILE INSTALLED IN A USER DEVICE WHICH IS ACCESSIBLE TO A RADIOCOMMUNICATION NETWORK, COMPUTER PROGRAM PRODUCT, AND CORRESPONDING DEVICES

(71) Applicant: ORANGE, Issy-les-Moulineaux (FR)

(72) Inventors: Mohammed Dadas, Châtillon (FR); Imed Allal, Châtillon (FR); Hervé Dieudop Kouahou, Châtillon (FR); Laurent Vieilledent, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 519 days.

(21) Appl. No.: 17/769,093

(22) PCT Filed: Sep. 30, 2020

(86) PCT No.: PCT/FR2020/051714
§ 371 (c)(1),
(2) Date: Apr. 14, 2022

(87) PCT Pub. No.: WO2021/074499
PCT Pub. Date: Apr. 22, 2021

(65) Prior Publication Data
US 2023/0039009 A1    Feb. 9, 2023

(30) Foreign Application Priority Data
Oct. 15, 2019   (FR) ..................................... 1911430

(51) Int. Cl.
*H04W 8/26*    (2009.01)
*H04L 9/40*    (2022.01)
*H04W 12/12*   (2021.01)

(52) U.S. Cl.
CPC ........... *H04W 8/265* (2013.01); *H04L 63/102* (2013.01); *H04W 12/12* (2013.01)

(58) Field of Classification Search
CPC ...... H04L 63/102; H04W 8/265; H04W 12/12
See application file for complete search history.

(56) References Cited

U.S. PATENT DOCUMENTS 9,949,097 B1 * 4/2018 Mudimela ............. H04M 3/563
11,277,872 B2 * 3/2022 Mori ....................... H04W 4/40
(Continued)

FOREIGN PATENT DOCUMENTS

WO    2018183332 A1    10/2018

OTHER PUBLICATIONS

International Search Report dated Nov. 30, 2020 for corresponding International Application No. PCT/FR2020/051714, Sep. 30, 2020.
(Continued)

*Primary Examiner* — Melanie Jagannathan
(74) *Attorney, Agent, or Firm* — David D. Brush; Westman, Champlin & Koehler, P.A.

(57) ABSTRACT

A method for activating an operational profile installed in a user device which is accessible to a radiocommunication network. The operational profile includes data which allows the user device to access the radiocommunication network. In such a method, the user device carries out a step of deactivating a current operational profile and activating a passive operational profile. The passive operational profile: prevents the user device from sending to the radiocommunication network at least one location update request and/or at least one attachment request to the radiocommunication network; and allows the user device to receive at least one radio-paging message including a unique identifier for the user device.

17 Claims, 3 Drawing Sheets

(56) References Cited

U.S. PATENT DOCUMENTS

| | | | |
|---|---|---|---|
| 2009/0170507 A1* | 7/2009 | Kim | H04W 60/02 |
| | | | 455/433 |
| 2011/0111726 A1* | 5/2011 | Kholaif | H04W 76/50 |
| | | | 455/456.2 |
| 2012/0258725 A1 | 10/2012 | Yi et al. | |
| 2014/0128032 A1* | 5/2014 | Muthukumar | H04W 52/0254 |
| | | | 455/412.2 |
| 2015/0282057 A1* | 10/2015 | Li | H04B 7/0871 |
| | | | 455/552.1 |
| 2015/0289221 A1* | 10/2015 | Nayak | H04W 60/005 |
| | | | 455/435.1 |
| 2016/0165433 A1* | 6/2016 | Larignon | H04W 8/205 |
| | | | 455/419 |
| 2016/0295544 A1* | 10/2016 | Jiang | H04W 12/35 |
| 2016/0373928 A1* | 12/2016 | Devarayanigari | H04L 69/28 |
| 2017/0070878 A1* | 3/2017 | Anslot | H04W 8/04 |
| 2017/0134945 A1* | 5/2017 | Goel | H04W 48/18 |
| 2017/0251328 A1* | 8/2017 | Klein | H04W 4/06 |
| 2019/0141551 A1* | 5/2019 | Berlin | H04W 24/08 |
| 2020/0396624 A1* | 12/2020 | Sevindik | H04W 24/10 |
| 2021/0021990 A1* | 1/2021 | Nelurouth | H04W 12/08 |
| 2021/0029531 A1* | 1/2021 | Mote | H04W 8/04 |
| 2021/0099867 A1* | 4/2021 | Brown | H04W 12/72 |
| 2021/0352505 A1* | 11/2021 | Sevindik | H04W 24/08 |
| 2022/0053607 A1* | 2/2022 | Rice | H04B 17/318 |
| 2022/0240213 A1* | 7/2022 | Ly | H04W 60/04 |

OTHER PUBLICATIONS

Written Opinion of the International Searching Authority dated Nov. 30, 2020 for corresponding International Application No. PCT/FR2020/051714, filed Sep. 30, 2020.

English translation of the Written Opinion of the International Searching Authority dated Dec. 8, 2020 for corresponding International Application No. PCT/FR2020/051714, filed Sep. 30, 2020.

* cited by examiner

METHOD FOR ACTIVATING AN OPERATIONAL PROFILE INSTALLED IN A USER DEVICE WHICH IS ACCESSIBLE TO A RADIOCOMMUNICATION NETWORK, COMPUTER PROGRAM PRODUCT, AND CORRESPONDING DEVICES

CROSS-REFERENCE TO RELATED APPLICATION

This Application is a Section 371 National Stage Application of International Application No. PCT/FR2020/051714, filed Sep. 30, 2020, which is incorporated by reference in its entirety and published as WO 2021/074499 A1 on Apr. 22, 2021, not in English.

FIELD OF THE INVENTION

The field of the invention is that of implementing radiocommunication networks. The invention relates more particularly to resource management in such radiocommunication networks.

The invention has many applications, in particular, but not exclusively, in the field of radiocommunication networks compliant with the latest generations or future generations of the 3GPP (3rd Generation Partnership Project) standards.

PRIOR ART AND ITS DISADVANTAGES

In most cases, a user device (e.g. a smartphone, a tablet or a computer equipped with a cellular connection, etc.) intended to be connected to a radiocommunication network is equipped with a SIM (Subscriber Identity Module) card. The SIM card contains the data that are necessary for the user device to establish a connection with the network in question. For such devices, the SIM card is traditionally a physical card provided by the operator when subscribing.

Such a card is thus by nature removable from the user device. Thus, when the corresponding subscription is terminated, the user of the device naturally removes the now unusable SIM card from the device in question. This is for example the case in order to insert a new SIM card corresponding to a new subscription. Alternatively, if the user no longer uses the device after the subscription is terminated, the user often turns off the device (or the latter naturally turns off once the battery is discharged). Thus, even though the user would leave the now unusable SIM card in the user device, the user device would not send any requests over the network of the designated operator via the SIM card.

However, new user devices, such as some connected objects, are equipped with an embedded SIM card technology, e.g. an eSIM (Embedded Subscriber Identity Module) or an iSIM (Integrated Subscriber Identity Module). More particularly, an operational profile containing the data which allows access to the network is activated in the embedded SIM card. Thus, even though the subscription is terminated, the embedded SIM card containing the operational profile remains in the corresponding user device. In addition, such connected objects have a very large autonomy and are sometimes placed in places where they are left even though their subscription to an operator has been terminated (e.g. a humidity sensor placed outside a building, etc.). In this way, such connected objects continue to send requests to the network even though their subscription is terminated.

Thus, since the deployment of such connected objects, a significant increase in the number of responses with an error code (e.g. "Unknown Subscriber") has been observed following requests of the type attachment request, send authentication information request, or location update request. The requests in question come mainly from subscribers who have been deleted but whose user devices have SIM cards that are still present in an active module. The increasing number of such exchanges generates unnecessary traffic and an increased network load. There is thus a need to reduce the network load related to deleted subscribers whose user devices have SIM cards that are still present in an active module.

There is also a need for the network to still be able to communicate with such user devices if necessary.

SUMMARY OF THE INVENTION

In an embodiment of the invention, a method for activating an operational profile installed in a user device which is accessible to a radiocommunication network is proposed. The operational profile comprises data which allows the user device to access the radiocommunication network when the operational profile is activated in the user device. In such a method, the user device carries out a step of deactivating a current operational profile and activating a passive operational profile. The passive operational profile:
- prevents the user device from sending to the radiocommunication network at least one location update request and/or at least one attachment request to the radiocommunication network; and
- allows the user device to receive at least one radio-paging message comprising a unique identifier for the user device.

Thus, the invention proposes a new and inventive solution to reduce the load on the radiocommunication network (e.g. a GSM (Global System for Mobile Communications), GPRS (General Packet Radio Service), EPGRS (Enhanced GPRS) network, etc.) related to requests from user devices that no longer have a subscription with the operator of the network in question.

For example, such a user device is a connected object equipped with an eSIM (Embedded Subscriber Identity Module) or an iSIM (Integrated Subscriber Identity Module). Once the subscription is terminated with the operator, the current operational profile remains active on the eSIM or the iSIM of the user device. Such a current operational profile causes regular requests to be sent over the network even though such requests cannot be completed, the subscription of the user device having been terminated. The activation of the passive operational profile can prohibit some requests and thus to reduce the network load.

In addition, the passive operational profile allows the user device to receive the radio-paging messages (sometimes referred to as telemessaging or "paging" messages) intended for it via the unique identifier (e.g., an International Mobile Subscriber Identity (IMSI) number). In this way, the network is still able to communicate with the user device, e.g. in order to update the passive operational profile or otherwise.

In embodiments, the user device receives a request, transmitted by the radiocommunication network, to deactivate the current operational profile. The step of deactivating a current operational profile and activating a passive operational profile is implemented in response to the deactivation request.

Thus, the network has control over the activation of the passive operational profile.

In embodiments, the user device:
sends to the radiocommunication network an attachment request; and
receives a message representative of a connection failure from the user device, the message representative of a connection failure being sent by the radiocommunication network in response to the attachment request.

Sending repeatedly an attachment request a predetermined number of times delivers a predetermined number of messages representative of a connection failure. The step of deactivating a current operational profile and activating a passive operational profile is implemented in response to the receipt of the predetermined number of messages representative of a connection failure.

Thus, the user device is autonomous for the activation of the passive operational profile. In embodiments, the user device:
receives a request, transmitted by the radiocommunication network, to deactivate the current operational profile;
sends to the radiocommunication network a request to obtain the passive operational profile.

The request to obtain the passive operational profile is sent upon receipt of the request to deactivate the current operational profile; and
receives the passive operational profile sent by the radiocommunication network in response to the request to obtain the passive operational profile.

Thus, the user device can implement the activation of the passive profile even though the passive profile in question is not previously installed in the user device at the time of receiving the deactivation request.

In embodiments, the user device receives the passive operational profile sent by the radiocommunication network.

Thus, the network has control over the parameters of the passive operational profile, allowing a fine control over the behaviour of the user device with respect to the network in question.

In embodiments, the user device receives a radio-paging message, sent by the radiocommunication network, comprising the unique identifier for the user device and a data field causing, by the user device, a deactivation of the passive operational profile and a reactivation of the current operational profile.

Thus, the network has control over the reactivation of the current operational profile previously deactivated in favour of the passive operational profile. In addition, such a reactivation is done in a simple and effective way via the use of a radio-paging message, sometimes referred to as a telemessaging or "paging" message.

In embodiments, the user device deletes the passive operational profile after the current operational profile is deactivated.

Thus, no data related to the previous subscription of the user device remains in the user device even if the operator of the radio network does not request it.

In embodiments, the user device receives a deletion request, sent by the radiocommunication network, causing, by the user device, the deletion of the current operational profile.

Thus, the operator of the radiocommunication network ensures that no data related to the previous subscription of the user device remains in the user device.

In embodiments, the network sends to the user device a request to deactivate the current operational profile. The deactivation request causes at the user device the implementation of the above-mentioned step of deactivating the current operational profile and activating the above-mentioned passive operational profile.

Thus, the network has control over the activation of the passive operational profile.

In embodiments, the network:
creates the passive operational profile; and
sends the passive operational profile to the user device.

Thus, the network has control over the parameters of the passive operational profile, allowing a fine control over the behaviour of the user device with respect to the network in question.

In embodiments, the network sends to the user device a radio-paging message comprising the unique identifier for the user device and a data field causing, by the user device, the implementation of the above-mentioned step of deactivating the passive operational profile and reactivating the current operational profile.

Thus, the network has control over the reactivation of the current operational profile previously deactivated in favour of the passive operational profile. In addition, such a reactivation is done in a simple and effective way via the use of a radio-paging message (sometimes referred to as a telemessaging or "paging" message).

In embodiments, the step of deactivating the passive operational profile and reactivating the current operational profile comprises redefining a reset operational profile from the passive operational profile to the current operational profile.

In embodiments, the step of deactivating the passive operational profile and activating the current operational profile is implemented using a "Fallback Mechanism" protocol according to the GSM ESIM M2M (Global System for Mobile communications Association Embedded Subscriber Identity Module for Machine to Machine) standard.

In embodiments, the network sends to the user device the deletion request causing, by the user device, the implementation of the step of deleting the current operational profile.

Thus, the operator of the radiocommunication network ensures that no data related to the previous subscription of the user device remains in the user device.

In embodiments, the passive operational profile:
requires that the user device rejects any request sent by the radiocommunication network via a message other than the at least one radio-paging message comprising the unique identifier for the user device; and/or
prevents the user device from requesting a detachment from the radiocommunication network.

Thus, activating the passive operational profile further minimises the network load by not responding to the network requests. In addition, the prohibition of implementing a detachment from the network ensures that the network will still be able to communicate with the user device by knowing the unique identifier for the user device (e.g. the IMSI number of the user device). Indeed, such a detachment implies the radiocommunication network to forget the unique identifier for the user device, via e.g. a memory erasure.

In embodiments, the step of deactivating the current operational profile and activating the passive operational profile comprises redefining a reset operational profile from the current operational profile to the passive operational profile.

In embodiments, the step of deactivating the current operational profile and activating the passive operational profile is implemented using the "Fallback Mechanism" protocol according to the GSM ESIM M2M standard.

The invention also relates to a computer program comprising program code instructions for implementing the activation method described above (according to any one of the different above-mentioned embodiments), when it is executed on a computer.

In another embodiment of the invention, a device comprising a reprogrammable computing machine or a dedicated computing machine, configured to implement the steps of the activation method according to the invention as implemented by the user device (according to any one of the above-mentioned embodiments) is proposed.

In another embodiment of the invention, a device comprising a reprogrammable computing machine or a dedicated computing machine, configured to implement the steps of the activation method according to the invention as implemented by the radiocommunication network (according to any one of the above-mentioned embodiments) is proposed.

Thus, the characteristics and advantages of these devices are the same as those of the activation method previously described. Therefore, they are not detailed further.

LIST OF FIGURES

Other purposes, features and advantages of the invention will become more apparent upon reading the following description, hereby given to serve as an illustrative and non-restrictive example, in relation to the figures, among which.

DETAILED DESCRIPTION OF THE EMBODIMENTS OF THE INVENTION

The general principle of the invention is based on the deactivation of a current operational profile and the activation of a passive operational profile in a user device which is accessible to a radiocommunication network. Such an operational profile comprises data which allows the user device to access the radiocommunication network when the operational profile in question is activated in the user device. For example, such an operational profile follows the structure defined in Appendix C, "*Example of Profile Package*", Section 11.1, "*Example of Profile Package structure*", of the SIM Alliance standard document: "*eUICC Profile Package: Interoperable Format Technical Specification Version 2.1*" dated Feb. 24, 2017.

More particularly, the passive operational profile:
prevents the user device from sending to the radiocommunication network one (or more) location update request(s) and/or one (or more) attachment request(s) to the radiocommunication network; and
allows the user device to receive one (or more) radio-paging message(s) (sometimes referred to as telemessaging or "paging" messages) comprising a unique identifier for the user device (e.g., an International Mobile Subscriber Identity (IMSI) number).

Thus, the activation of the passive operational profile can prohibit some requests and thus to reduce the network load. In addition, the passive operational profile allows the user device to receive the radio-paging messages intended for it via the unique identifier. In this way, the network is still able to communicate with the user device, e.g. in order to update the passive operational profile or otherwise. For example, such a behaviour of the user device is achieved via the modification of the "PE-GSM-ACCESS" field of the passive operational profile when the passive operational profile follows the structure defined in the above-mentioned SIM Alliance standard document.

Figure 1:
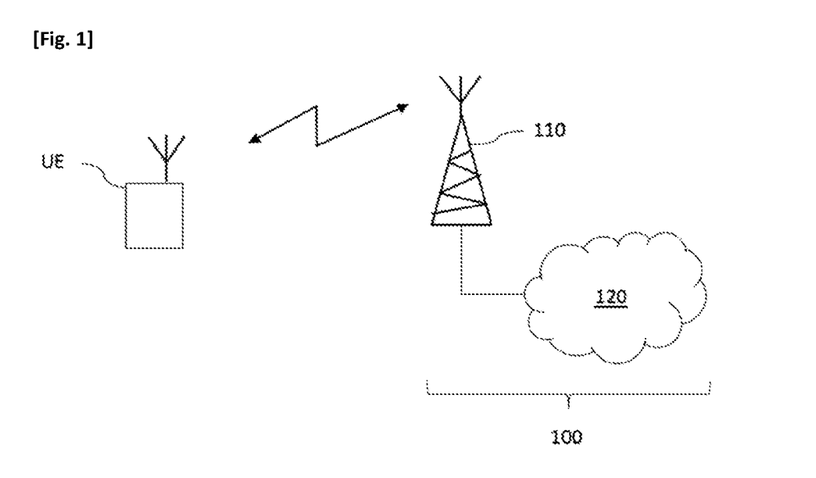
FIG. 1 represents a user device located within the range of a base station of a radiocommunication network according to an embodiment of the invention.

In relation to FIG. 1, a user device UE located within the range of a base station 110 of a radiocommunication network 100 according to an embodiment of the invention is now presented.

More particularly, the radiocommunication network 100 is a GSM network according to one of its evolutions allowing data transfer (e.g. a GPRS, EPGRS, etc. evolution). In other embodiments, the radiocommunication network 100 follows another cellular standard allowing data transfer, e.g. a network according to the 3G, 4G, etc. standard as defined by the 3GPP. In other embodiments, the radiocommunication network 100 is a low-speed network dedicated to connected objects such as LoRa®, SigFox®, etc.

Back to FIG. 1, the radiocommunication network 100 comprises a network core 120 and a base station 110 to which the user device UE is connected. The network core 120 implements different functional modules, e.g. within one or more network nodes, such as MME (Mobility Management Entity), MSC (Mobile Switching Center), MSC (Serving GPRS Support Node), HLR (Home Location Register), etc.

The user device UE is a connected object equipped with an emulated SIM card, e.g. an eSIM. In other embodiments, the user device is equipped with an integrated SIM card, e.g. an iSIM. In other embodiments, the user device is a terminal comprising radiocommunication means for connecting to a radiocommunication network, e.g. a smartphone, a tablet or a computer equipped with a cellular connection, etc.

Back to FIG. 1, a current operational profile is present in the emulated SIM card. As discussed above, such an operational profile comprises data which allows the user device UE to access the radiocommunication network 100 when the operational profile in question is activated in the user device UE. In particular, the current operational profile comprises a unique identifier for the user device UE, i.e. an identifier that is different for each user device UE connected to the network 100. Such a unique identifier (e.g., an IMSI number) allows the network 100 to send messages intended only for the user device UE and to identify the origin of messages sent by different user devices UE.

The subscription of the user device UE has been terminated with the operator of the network 100. However, the current operational profile is still activated in the user device UE. In this way, as long as its energy resources allow it to do so, the user device UE continues to send to the network 100 requests of the type: attachment request, send authentication information request, location update request, etc. This creates an unnecessary load on the network 110.

However, the user device UE and the network 100 are configured to implement the method for activating an operational profile as described below in relation to FIG. 2*a*, FIG. 2*b* and FIG. 2*c*. In this way, the load on the network 100 remains under control.

Figure 2A:
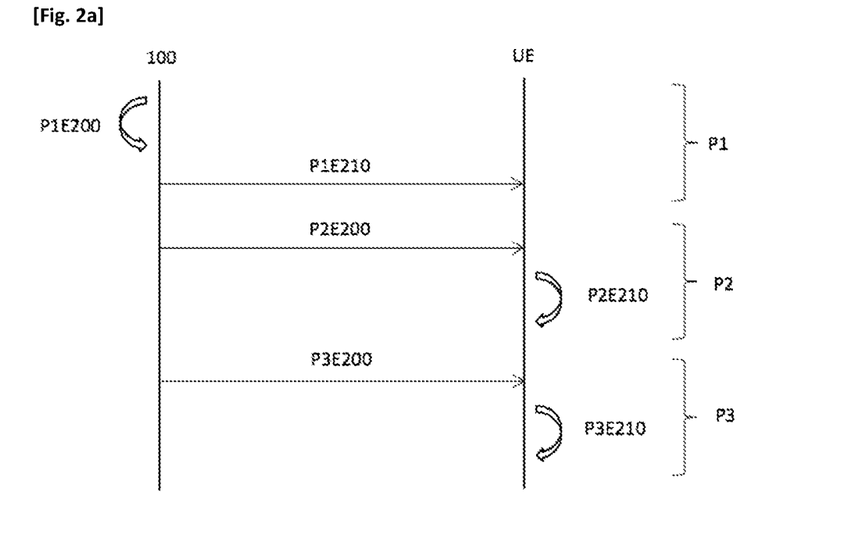
FIG. 2a represents the steps of the method for activating an operational profile installed in the user device of FIG. 1 according to an embodiment of the invention.

In relation to FIG. 2*a*, the steps of a method for activating an operational profile installed in the user device UE of FIG. 1 according to an embodiment of the invention is now presented.

Phase P1: Obtaining the Passive Operational Profile

In a step P1E200, the network 100 creates a passive operational profile. When it is activated in the user device UE, such a passive operational profile:
- prevents the user device UE from sending to the network 100 one (or more) location update request(s) and/or one (or more) attachment request(s) to the network 100; and
- allows the user device UE to receive one (or more) radio-paging message(s) comprising a unique identifier for the user device (e.g. an IMSI number).

Thus, the activation of such a passive operational profile at the user device UE can prohibit some requests and thus to reduce the load on the network 100. However, the network 100 is still able to communicate with the user device UE. In this sense, the user device UE adopts a passive behaviour from the network 100 point of view.

In some embodiments, the passive operational profile:
- requires that the user device UE rejects any request sent by the network 100 via a message other than the radio-paging message(s) comprising the unique identifier for the user device UE; and/or
- also prevents the user device UE from requesting a detachment from the network 100, such a detachment involving that the network 100 forgets the unique identifier for the user device UE (via e.g. a memory erasure).

Thus, activating the passive operational profile according to these embodiments further minimises the load on the network 100 by not responding to the network 100 requests. In addition, the prohibition of implementing a detachment from the network 100 ensures that the network 100 will still be able to communicate with the user device UE by knowing the unique identifier for the user device UE (e.g., the IMSI number of the user device UE).

Back to FIG. 2*a*, in a step P1E210, the network 100 sends (e.g. via a message using the OTA (Over The Air) protocol) as defined in the GSMA consortium standard document: "*Remote Provisioning Architecture for Embedded UICC Technical Specification V*4.0" of February 2019) the passive operational profile to the user device UE (e.g., via an OSM "On-Demand Subscription Manager" functional module) of the network 100). The user device UE thus obtains the passive operational profile by receiving the passive operational profile sent by the network 100.

In other embodiments, the user device UE does not receive the passive operational profile sent by the network 100. The passive operational profile is for example pre-installed by default in the embedded card of the user device UE.

Phase P2: Activating the Passive Operational Profile

Back to FIG. 2*a*, in a step P2E200, the user device UE receives a request, transmitted by the network 100, to deactivate the current operational profile.

In a step P2E210, the user device UE carries out a step of deactivating the current operational profile and activating the passive operational profile.

According to this embodiment, the implementation of step P2E210 by the user device UE is caused by the receipt of the request to deactivate the current operational profile. In other embodiments described below in particular in relation to FIG. 2*b* and FIG. 2*c*, the implementation of step P2E210 by the user device UE is caused by other conditions.

In some embodiments, step P2E210 of deactivating the current operational profile and activating the passive operational profile comprises redefining a reset operational profile from the current operational profile to the passive operational profile. In other words, the passive operational profile becomes the default operational profile, e.g. the operational profile that is activated by default when the user device UE is reset. For example, such a step P2E210 of deactivating the current operational profile and activating the passive operational profile is implemented using a "Fallback Mechanism" protocol according to the GSM ESIM M2M (Global System for Mobile communications Association Embedded Subscriber Identity Module for Machine to Machine) standard.

Phase P3: Deleting the Deactivated Current Operational Profile

Back to FIG. 2*a*, in a step P3E200, the network 100 sends to the user device UE a deletion request (e.g. via a message using the OTA protocol), causing the implementation of a step P3E210 by the user device UE. In step P3E210, the user device UE deletes the current operational profile upon receipt of the deletion request. Thus, the operator of the radiocommunication network ensures that no data related to the previous subscription of the user device remains in the user device. In some embodiments, step P3E200 is not implemented and the user device UE carries out step P3E210 of deleting the current operational profile after step P2E210 of deactivating the current operational profile is implemented. In this case, the user device UE carries out step P3E210 without waiting for a specific request in this sense from the network 100. Thus, no data related to the previous subscription of the user device remains in the user device even if the operator of the radio network does not request it.

In other embodiments, phase P3 as described above (according to any one of the above-mentioned embodiments) is not implemented and the current operational profile is not deleted after being deactivated. This is for example the case when a phase P4 as described below in relation to FIG. 2*d* is implemented.

Figure 2B:
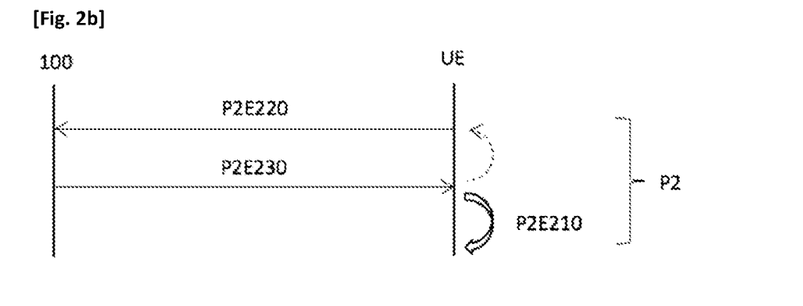
FIG. 2b, FIG. 2c and FIG. 2d represent some steps of the method for activating an operational profile installed in the user device of FIG. 1 according to other embodiments of the invention.

In relation to FIG. 2*b*, some steps of the method for activating an operational profile installed in the user device of FIG. 1 according to another embodiment of the invention are now presented. More particularly, the embodiment of FIG. 2*b* relates to the steps of phase P2 of activating the passive operational profile.

According to this embodiment, in a step P2E220, the user device UE sends an attachment request to the network 100. Yet, as discussed above in relation to FIG. 1, the user device UE no longer subscribes to the network 100. Thus, in a step P2E230, the network 100 sends to the user device UE a message representative of a connection failure of the user device UE in response to the attachment request. After receiving the message in question, the user device UE is able to send a new attachment request which will also cause a connection failure and so on. However, following receipt of a predetermined number of messages representative of a connection failure, step P2E210 of deactivating the current operational profile and activating the passive operational profile is implemented so as to limit the load on the network 100. According to this embodiment, the user device is autonomous for the activation of the passive operational profile.

In some variants, such an embodiment of phase P2 is combinable with the embodiments of phase P1 and/or of phase P3 described above in relation to FIG. 2a. In other variants, such an embodiment of phase P2 is combinable with the embodiments of phase P1 described above in relation to FIG. 2a and/or of phase P4 described below in relation to FIG. 2d.

Figure 2C:
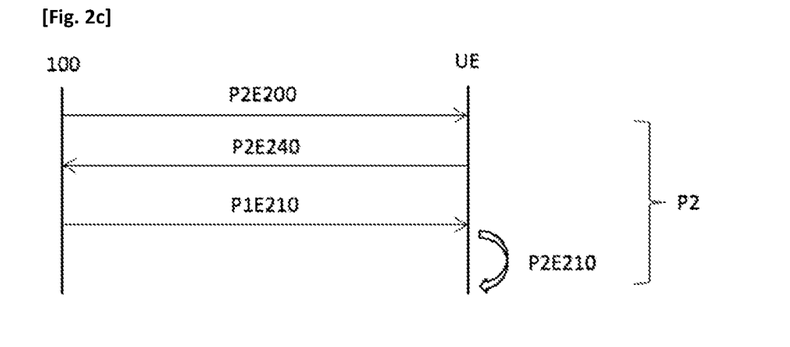
Figure 2D:
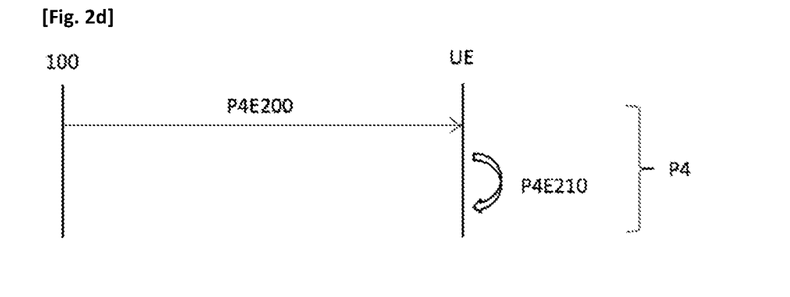

In relation to FIG. 2c, some steps of the method for activating an operational profile installed in the user device of FIG. 1 according to another embodiment of the invention are now presented.

More particularly, the embodiment of FIG. 2c relates to the steps of phase P2 of activating the passive operational profile.

According to this embodiment too, phase P2 comprises step P2E200 during which the user device UE receives a request, transmitted by the network 100, to deactivate the current operational profile.

However, in the embodiment of FIG. 2c, the user device UE receives such a request while no passive operational profile is installed in the user device UE. This situation results, for example, from the fact that the step P1E210 previously implemented during a phase P1 (according to any one of the above-mentioned embodiments) was not successful, for example because the quality of the data received by the user device UE is too poor due to the radio propagation conditions. In this way, in a step P2E240, the user device UE sends a request to the network 100 to obtain the passive operational profile. In response to the request in question, the network implements step P1E210 of sending the passive operational profile to the user device UE. The user device UE thus obtains the passive operational profile by receiving the passive operational profile sent by the network 100. The user device UE implements step P2E210 of deactivating the current operational profile and activating the passive operational profile (according to any one of the above-mentioned embodiments).

In some variants, such an embodiment of phase P2 is combinable with the embodiments of phase P1 and/or of phase P3 described above in relation to FIG. 2a. In other variants, such an embodiment of phase P2 is combinable with the embodiments of phase P1 described above in relation to FIG. 2a and/or of phase P4 described below in relation to FIG. 2d.

In relation to FIG. 2d, some steps of the method for activating an operational profile installed in the user device of FIG. 1 according to another embodiment of the invention are now presented.

Phase P4: Reactivating the Deactivated Current Operational Profile

This embodiment applies in the case where phase P3 (according to any one of the above-mentioned embodiments) described above in relation to FIG. 2a is not implemented. In other words, phase P4 applies when the current operational profile is not removed from the user device UE once it is deactivated.

Thus, in a step P4E200, the network 100 sends to the user device UE a radio-paging message comprising the unique identifier for the user device UE. The radio-paging message further comprises a data field causing the implementation of a step P4E210 by the user device UE. More particularly, in step P4E210, the user device UE deactivates the passive operational profile and reactivates the current operational profile. According to this embodiment, the implementation of step P4E210 by the user device UE is caused by the receipt of the request to deactivate the passive operational profile. Thus, the network has control over the reactivation of the current operational profile previously deactivated in favour of the passive operational profile.

In some embodiments, step P4E210 of deactivating the passive operational profile and reactivating the current operational profile comprises redefining the reset operational profile from the passive operational profile to the current operational profile. In other words, the current operational profile becomes the default operational profile again, e.g. the operational profile that is activated by default when the user device UE is reset. For example, such a step P4E210 of deactivating the current operational profile and activating the passive operational profile is implemented using a "Fallback Mechanism" protocol according to the GSM ESIM M2M (Global System for Mobile communications Association Embedded Subscriber Identity Module for Machine to Machine) standard.

Such embodiments of phase P4 are combinable with the embodiments of phases P1 and P2 described above in relation to FIGS. 2a, 2b and 2c.

Figure 3:
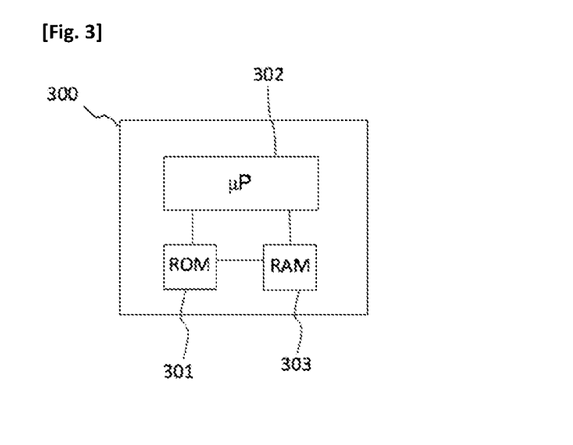
FIG. 3 represents an example of the structure of a device allowing the implementation of some steps of the method for activating an operational profile according to an embodiment of the invention.

In relation to FIG. 3, an example of the structure of a device 300 allowing the implementation of some steps of the method for activating an operational profile of FIGS. 2a to 2d according to an embodiment of the invention is now presented. More particularly, the device 300 can implement all or part of the steps of the method for activating an operational profile as implemented within the user device UE.

The device 300 comprises a random access memory 303 (a RAM memory, for example), a processing unit 302 equipped for example with a processor and controlled by a computer program stored in a read-only memory 301 (a ROM memory or hard disk, for example). At initialisation, the code instructions of the computer program are for example loaded into a volatile memory 303 before being executed by the processor of the processing unit 302.

This FIG. 3 only shows a particular one of several possible ways of realising the device 300 so that it carries out some steps of the method for activating an operational profile according to the invention (according to any one of the embodiments and/or variants described above in relation to FIGS. 2a to 2d). Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device 300 is realised with a reprogrammable computing machine, the corresponding program (i.e. the sequence of instructions) can be stored in a removable (such as, for example, a CD-ROM, a DVD-ROM or a USB flash drive) or non-removable storage medium, this storage medium being partially or totally readable by a computer or a processor.

In some embodiments, the device 300 is included in the user device UE.

Figure 4:
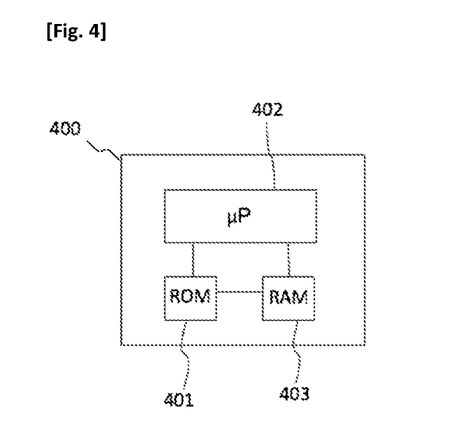
FIG. 4 represents an example of the structure of a device allowing the implementation of other steps of the method for activating an operational profile according to an embodiment of the invention.

In relation to FIG. 4, an example of the structure of a device 400 allowing the implementation of some steps of the method for activating an operational profile of FIGS. 2a to 2d according to an embodiment of the invention is now presented. More particularly, the device 400 can implement all or part of the steps of the method for activating an operational profile as implemented within the network 100.

The device 400 comprises a random access memory 403 (a RAM memory, for example), a processing unit 402 equipped for example with a processor and controlled by a computer program stored in a read-only memory 401 (a ROM memory or hard disk, for example). At initialisation, the code instructions of the computer program are for example loaded into a volatile memory 403 before being executed by the processor of the processing unit 402.

This FIG. 4 only shows a particular one of several possible ways of realising the device 400 so that it carries out some steps of the method for activating an operational profile according to the invention (according to any one of the embodiments and/or variants described above in relation to FIGS. 2a to 2d). Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device 400 is realised with a reprogrammable computing machine, the corresponding program (i.e. the sequence of instructions) can be stored in a removable (such as, for example, a CD-ROM, a DVD-ROM or a USB flash drive) or non-removable storage medium, this storage medium being partially or totally readable by a computer or a processor.

In some embodiments, the device 400 is included in a device of the network 100, e.g., in a node of the network 100.

The invention claimed is:

1. A method comprising:
activating an operational profile installed in a user device which is accessible to a radiocommunication network, said operational profile comprising data which allows said user device to access said radiocommunication network when said operational profile is activated in said user device, wherein the activating comprises:
said user device deactivating a current operational profile and activating a passive operational profile, said passive operational profile preventing said user device from sending to said radiocommunication network at least one of:
at least one location update request; or
at least one attachment request to said radiocommunication network.

2. The method according to claim 1, comprising:
said user device receiving a request, transmitted by said radio communication network, to deactivate said current operational profile, and
implementing said deactivating the current operational profile and activating the passive operational profile in response to said deactivation request.

3. The method according to claim 1, comprising said user device:
sending, to said radiocommunication network, an attachment request; and
receiving a message representative of a connection failure from said user device, said message representative of a connection failure being sent by said radiocommunication network in response to said attachment request,
said sending of an attachment request being repeated a predetermined number of times delivering a predetermined number of messages representative of a connection failure,
implementing said deactivating the current operational profile and activating the passive operational profile in response to receiving said predetermined number of messages representative of a connection failure.

4. The method according to claim 1, comprising said user device:
receiving a request, transmitted by said radiocommunication network, to deactivate said current operational profile;
sending to said radiocommunication network a request to obtain said passive operational, said request to obtain said passive operational profile being sent upon receipt of said request to deactivate said current operational profile; and
receiving said passive operational profile sent by said radiocommunication network in response to said request to obtain said passive operational profile.

5. The method according to claim 1, wherein said user device receives said passive operational profile sent by said radiocommunication network.

6. The method according to claim 1, comprising said user device receiving a radio-paging message, sent by said radiocommunication network, comprising a unique identifier for said user device and a data field causing, by said user device, a deactivation of said passive operational profile and a reactivation of said current operational profile.

7. The method according to claim 1, comprising said user device deleting said current operational profile after said deactivation of said current operational profile.

8. The method according to claim 7, comprising said user device receiving a deletion request, sent by said radiocommunication network, causing, by said user device, said deletion of said current operational profile.

9. A method comprising:
activating an operational profile installed in a user device which is accessible to a radiocommunication network, said operational profile comprising data which allows said user device to access said radiocommunication network when said operational profile is activated in said user device, wherein the activating comprises said radiocommunication network:
sending, to said user device, a request to deactivate a current operational profile, said deactivation request causing said user device to deactivate said current operational profile and activate said passive operational profile, said passive operational profile preventing said user device from sending to said radiocommunication network at least one of at least one location update request or at least one attachment request to said radiocommunication network.

10. The method according to claim 9, comprising said radiocommunication network:
creating said passive operational profile; and
sending said passive operational profile to said user device.

11. The method according to claim 9, comprising said radiocommunication network sending, to said user device, a radio-paging message comprising a unique identifier for said user device and a data field causing, by the user device, to deactivate said passive operational profile and reactivate said current operational profile.

12. The method according to claim 1, wherein said passive operational profile:
allows said user device to receive at least one radio-paging message comprising a unique identifier for said user device;
requires that said user device rejects any request sent by said radiocommunication network via a message other than said at least one radio-paging message comprising said unique identifier for said user device; and/or prevents said user device from requesting a detachment from said radiocommunication network.

13. A non-transitory computer-readable medium comprising program code instructions stored thereon for implementing a method, when said program is executed on a processor of a user device, wherein the method comprises:
activating an operational profile installed in the user device, which is accessible to a radiocommunication network, said operational profile comprising data which allows said user device to access said radiocommunication network when said operational profile is activated in said user device, wherein the activating comprises:
said user device deactivating a current operational profile and activating a passive operational profile, said passive operational profile preventing said user device from sending to said radiocommunication network at least one of:
at least one location update request; or
at least one attachment request to said radiocommunication network.

14. A user device comprising:
a reprogrammable computing machine or a dedicated computing machine configured to activate an operational profile installed in the user device, which is accessible to a radiocommunication network, said operational profile comprising data which allows said user device to access said radiocommunication network when said operational profile is activated in said user device, wherein the reprogrammable computing machine or dedicated computing machine is configured to activate the operational profile by:
deactivating a current operational profile; and
activating a passive operational profile, said passive operational profile preventing said user device from sending to said radiocommunication network at least one of:
at least one location update request; or
at least one attachment request to said radiocommunication network.

15. A device comprising:
a reprogrammable computing machine or a dedicated computing machine configured to activate an operational profile installed in a user device, which is accessible to a radiocommunication network, said operational profile comprising data which allows said user device to access said radiocommunication network when said operational profile is activated in said user device, wherein the reprogrammable computing machine or dedicated computing machine is configured to activate the operational profile by:
sending, to said user device, a request to deactivate a current operational profile, said deactivation request causing said user device to deactivate said current operational profile and activate said passive operational profile, said passive operational profile preventing said user device from sending to said radiocommunication network at least one location update request and/or at least one attachment request to said radiocommunication network.

16. The method according to claim 9, wherein said passive operational profile:
allows said user device to receive at least one radio-paging message comprising a unique identifier for said user device;
requires that said user device rejects any request sent by said radiocommunication network via a message other than said at least one radio-paging message comprising said unique identifier for said user device; and/or
prevents said user device from requesting a detachment from said radiocommunication network.

17. A non-transitory computer-readable medium comprising program code instructions stored thereon for implementing a method, when said program is executed on a processor of a device, wherein the method comprises:
activating an operational profile installed in a user device which is accessible to a radiocommunication network, said operational profile comprising data which allows said user device to access said radiocommunication network when said operational profile is activated in said user device, wherein the activating comprises:
sending, to said user device, a request to deactivate a current operational profile, said deactivation request causing said user device to deactivate said current operational profile and activate said passive operational profile, said passive operational profile preventing said user device from sending to said radiocommunication network at least one of at least one location update request or at least one attachment request to said radiocommunication network.

* * * * *